(12) United States Patent
Toma et al.

(10) Patent No.: US 12,273,580 B2
(45) Date of Patent: Apr. 8, 2025

(54) TRANSMITTING METHOD, RECEIVING METHOD, TRANSMITTING DEVICE, AND RECEIVING DEVICE

(71) Applicant: Panasonic Intellectual Property Corporation of America, Torrance, CA (US)

(72) Inventors: Tadamasa Toma, Osaka (JP); Noritaka Iguchi, Osaka (JP); Hisaya Katou, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/386,727

(22) Filed: Nov. 3, 2023

(65) Prior Publication Data
US 2024/0064359 A1 Feb. 22, 2024

Related U.S. Application Data

(63) Continuation of application No. 17/167,174, filed on Feb. 4, 2021, now Pat. No. 11,849,166, which is a
(Continued)

(30) Foreign Application Priority Data

Sep. 19, 2014 (JP) .................................. 2014-191896

(51) Int. Cl.
*H04N 21/43* (2011.01)
*H04N 21/234* (2011.01)
(Continued)

(52) U.S. Cl.
CPC . *H04N 21/43072* (2020.08); *H04N 21/23424* (2013.01); *H04N 21/2353* (2013.01);
(Continued)

(58) Field of Classification Search
CPC .............. G11B 27/00; H04N 21/2181; H04N 21/4325; H04N 21/47202
See application file for complete search history.

(56) References Cited

U.S. PATENT DOCUMENTS 7,237,250 B2 6/2007 Kanojia
9,986,005 B2 5/2018 Sim
(Continued)

FOREIGN PATENT DOCUMENTS

EP 2 597 870 5/2013
JP 2012-10009 1/2012

OTHER PUBLICATIONS

International Search Report of PCT application No. PCT/JP2014/005073 dated Dec. 22, 2014.
(Continued)

*Primary Examiner* — Olugbenga O Idowu
(74) *Attorney, Agent, or Firm* — Wenderoth, Lind & Ponack, L.L.P.

(57) ABSTRACT

A transmitting method according to one aspect of the present disclosure includes transmitting a first stream, the first stream including: timing update identification information id1 indicating whether or not a correspondence relationship between a first reference clock and a second reference clock has been updated, the first reference clock being used to transmit and receive the first stream, and the second reference clock being used to transmit and receive a second stream related to another content to be reproduced in synchronization with the content related to the first stream; a first time according to the first reference clock; and a second time according to the second reference clock, the second time being associated with the first time based on the updated correspondence relationship.

2 Claims, 15 Drawing Sheets

Related U.S. Application Data continuation of application No. 16/430,740, filed on Jun. 4, 2019, now Pat. No. 10,945,015, which is a continuation of application No. 15/007,042, filed on Jan. 26, 2016, now Pat. No. 10,368,115, which is a continuation of application No. PCT/JP2014/005073, filed on Oct. 6, 2014.

(60) Provisional application No. 61/889,728, filed on Oct. 11, 2013.

(51) Int. Cl.
| | | |
|---|---|---|
| *H04N 21/235* | (2011.01) | |
| *H04N 21/236* | (2011.01) | |
| *H04N 21/2365* | (2011.01) | |
| *H04N 21/242* | (2011.01) | |
| *H04N 21/262* | (2011.01) | |
| *H04N 21/84* | (2011.01) | |
| *H04N 21/8547* | (2011.01) | |
| *H04N 21/858* | (2011.01) | |

(52) U.S. Cl.
CPC ... *H04N 21/23614* (2013.01); *H04N 21/2365* (2013.01); *H04N 21/242* (2013.01); *H04N 21/26283* (2013.01); *H04N 21/84* (2013.01); *H04N 21/8547* (2013.01); *H04N 21/8586* (2013.01)

(56) References Cited

U.S. PATENT DOCUMENTS

| | | | |
|---|---|---|---|
| 2003/0028873 | A1* | 2/2003 | Lemmons ........ H04N 21/23418 |
| | | | 348/588 |
| 2005/0013377 | A1 | 1/2005 | Kirihara |
| 2005/0015796 | A1 | 1/2005 | Bruckner |
| 2008/0168470 | A1 | 7/2008 | Bushell |
| 2010/0319047 | A1 | 12/2010 | Mitsutake |
| 2012/0207215 | A1 | 8/2012 | Ryu |
| 2013/0074141 | A1 | 3/2013 | Hwang et al. |
| 2013/0125187 | A1 | 5/2013 | Kim |

OTHER PUBLICATIONS

Jean Le Feuvre (Telecom ParisTech) et al., "WD of ISO/IEC 13818-1:2012/AMD 6—Delivery of Timeline for External Data" Apr. 2013.

Extended European Search issued Aug. 25, 2016 in corresponding European Application No. 14853090.0.

* cited by examiner

*FIG. 1A*

```
TEMI_AU {
    has_mime
    has_location
    force_location_reload
    is_announcement reserved=0 if (has_mime) {
      mine_length
      for (i=0;i<mime_length;i++) {
        mime_type
      }
    }
    if (has_location) {
      location_length
      for (i=0;i<location_length;i++) {
        addon_location
      }
    } timescale
    if (is_announcement) {
      time_before_activation
    } else {
      media_time_anchor
    }
}
```

FIG. 2

```
TEMI_AU {
    has_mime
    has_location
    force_location_reload
    is_announcement
    is_timing_update ⁓—— id1 reserved=0 if (has_mime) {
      mine_length
      for (i=0;i<mime_length;i++) {
        mime_type
      }
    }
    if (has_location) {
      location_length
      for (i=0;<location_length;i++) {
        addon_location
      }
    } timescale
    if (is_announcement) {
      time_before_activation
    } else {
      media_time_anchor
    }
}
```

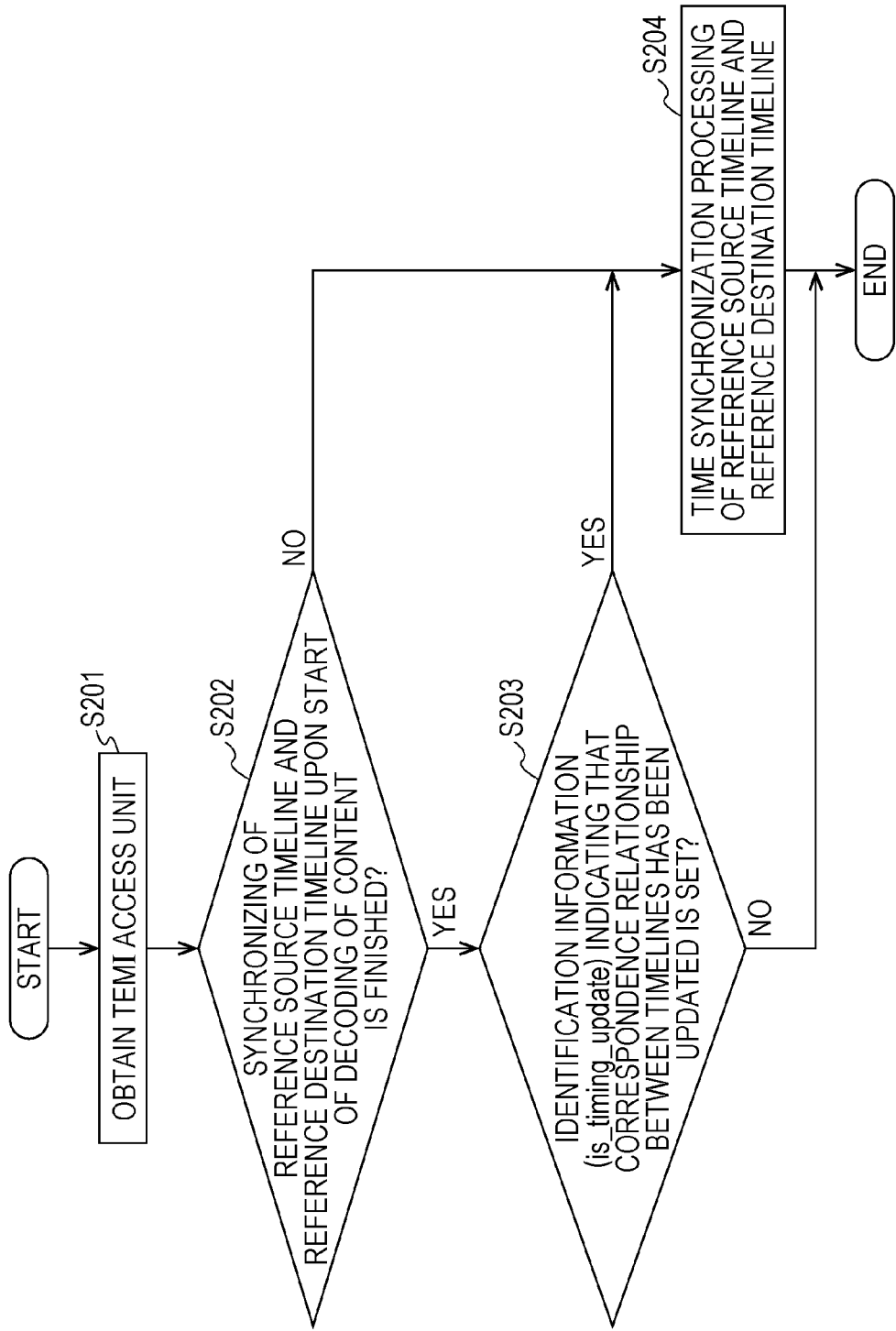

FIG. 7A

```
TEMI_AU {
    CRC_flag
    reserved
    for (i=0; i<N; i++) {
        temi_descriptor();
    }
    if (CRC_flag) {
        CRC_32
    }
}
```

FIG. 7B

```
temi_timeline_descriptor {
    temi_descr_tag
    temi_descr_length          id1
    is_timing_update
    has_timestamp
    has_ntp
    has_timecode
    reserved
    if (has_timestamp) {
      timescale
      if (has_timestamp==1) {
        media_timestamp
      } else if (has_timestamp==2) {
        media_timestamp
      }
    }
    if (has_ntp_timestamp) {
      ntp
    }
    if (has_timecode) {
      drop
      frames_per_to_seconds
      duration
      if (has_time_code==1) {
        short_time_coed
      } else if (has_timecode==2) {
        long_time_code
      }
    }
}
```

FIG. 7C

```
temi_location_descriptor {
    temi_descr_tag
    temi_descr_length force_reload
    is_announcement
    splicing_flag
    url_scheme
    reserved
    location_id
    if (is_announcement) {
        timescale
        time_before_activation
    }
    url_path_length
    for (i=0;i< url_path_length;i++) {
        url_path
    }
    nb_addons
    for (i=0;i< nb  addons ;i++) {
        service_type
        if (service_type==0) {
          mime_length
          for (j=0;j<mime_length;j++) {
            mime_type
          }
        }
        url_subpath_len
        for (j=0;j< url_subpath_len;j++) {
          addon_location
        }
    }
}
```

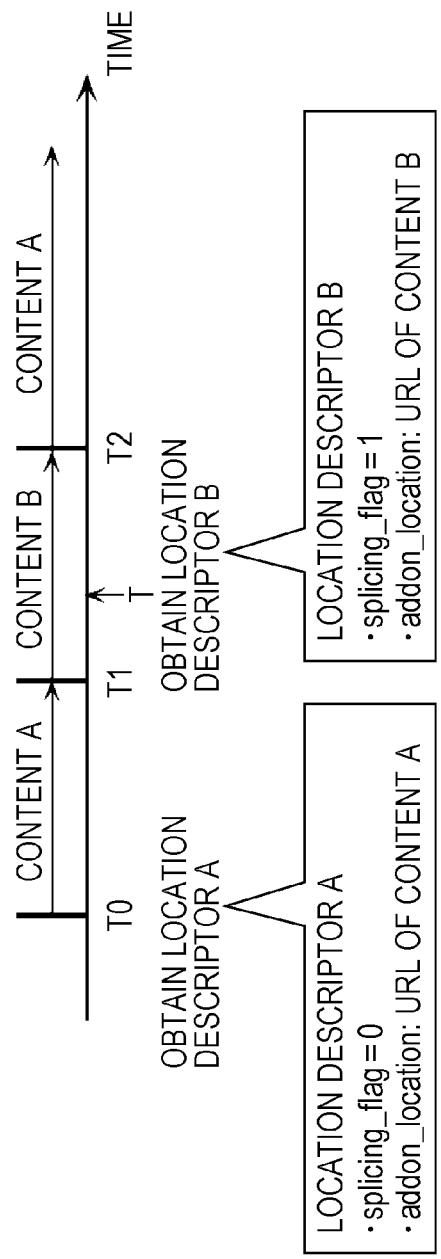

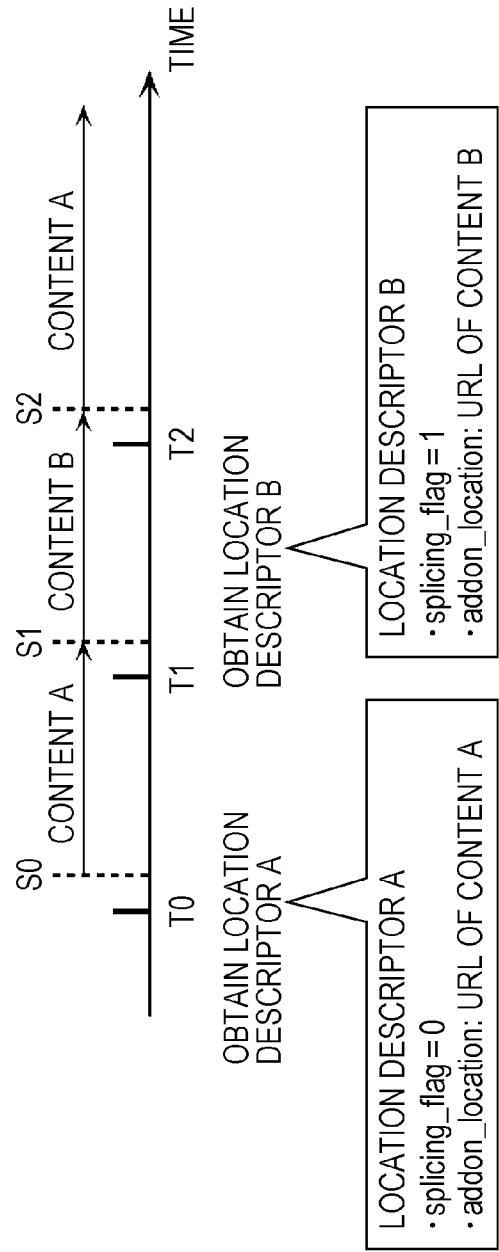

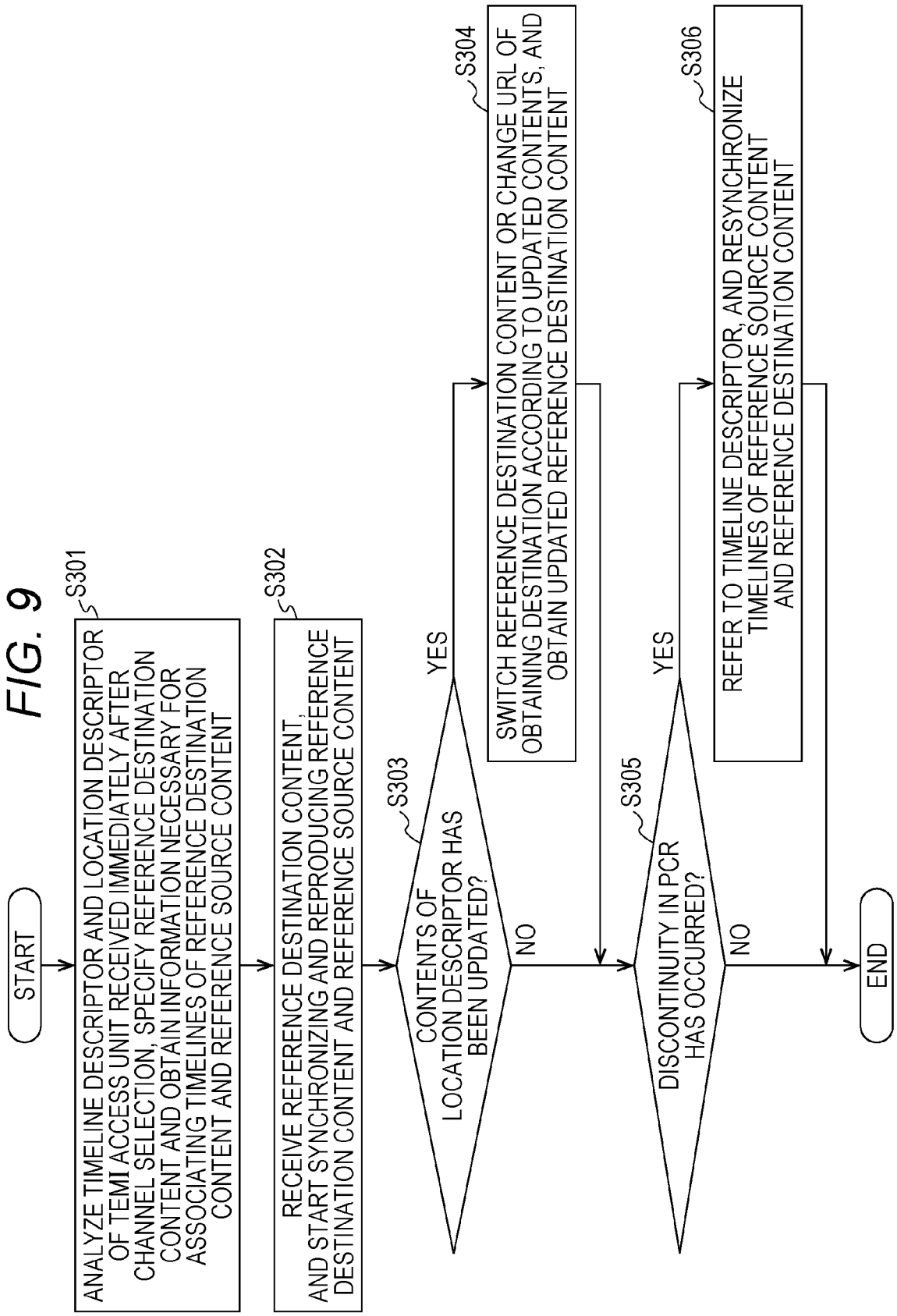

us 12,273,580 B2

TRANSMITTING METHOD, RECEIVING METHOD, TRANSMITTING DEVICE, AND RECEIVING DEVICE

BACKGROUND

1. Technical Field

The present disclosure relates to a transmitting method and a receiving method of data.

2. Description of the Related Art

Currently, standardization related to a data structure of auxiliary data indicating a relationship between PTSs (Presentation Time Stamp) of access units of streams which are independently transmitted is progressing (see, for example, NPL 1). The streams which are independently transmitted include streams transmitted according to MPEG-2 TS (Moving Picture Experts Group-2 Transport Stream), and streams transmitted in multiplexing formats such as MPEG-DASH (Dynamic Adaptive Streaming over HTTP) or MMT (MPEG Media Transport). Associating such PTSs of access units will be hereinafter referred to as timeline extension.

CITATION LIST

Patent Literature

NPL 1: Working Draft of ISO/IEC13181-1:2012/AMD6—Delivery of Timeline for External Data

SUMMARY

In one general aspect, the techniques disclosed here feature a transmitting method for transmitting a first stream related to content of an image or audio, the method comprising transmitting the first stream, the first stream including: timing update identification information indicating whether or not a correspondence relationship between a first reference clock and a second reference clock has been updated, the first reference clock being used to transmit and receive the first stream, and the second reference clock being used to transmit and receive a second stream related to another content to be reproduced in synchronization with the content related to the first stream; a first time according to the first reference clock, and a second time according to the second reference clock, the second time being associated with the first time based on the updated correspondence relationship.

It should be noted that general or specific embodiments may be implemented as a system, a method, an integrated circuit, a computer program, a storage medium, or any selective combination thereof.

As a transmitting method and a receiving method according to the present disclosure, there is provided a transmitting method and a receiving method in which timeline extension can be efficiently performed.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1A is a view illustrating a syntax of a TEMI access unit for describing a conventional problem;

FIG. 2 is a view illustrating an example of a syntax of a TEMI access unit according to an exemplary embodiment;

FIG. 6 is a flowchart illustrating an example of a processing operation of the receiving device according to the exemplary embodiment;

FIG. 7A is a view illustrating a syntax of a TEMI access unit according to a second modified example of the exemplary embodiment;

FIG. 7B is a view illustrating a syntax of a TEMI access unit according to the second modified example of the exemplary embodiment;

FIG. 7C is a view illustrating a syntax of a TEMI access unit according to the second modified example of the exemplary embodiment;

FIG. 8A is a view for describing a random access performed by a receiving device according to the second modified example of the exemplary embodiment;

FIG. 8B is a view for describing processing operations of a transmitting device and the receiving device when a time lag is taken into account according to the second modified example of the exemplary embodiment;

FIG. 9 is a flowchart illustrating an example of the processing operation of the receiving device according to the second modified example of the exemplary embodiment;

DETAILED DESCRIPTION (Underlying Knowledge Forming Basis of the Present Disclosure)

The inventors of the present disclosure found that a transmitting method and a receiving method according to NPL 1 described in the section of Background Art had following problems.

According to conventional timeline extension, auxiliary data streams are defined. In this case, streams which are transmitted independently from each other will be referred to as a reference source and a reference destination. Each of these streams includes items of different content indicating an image or audio. Further, the reference source is an auxiliary data stream. In one of PES (Packetized Elementary Stream) packets included in this auxiliary data stream, a TEMI (Timeline and External Media Information) access unit is stored. Further, in a header of this PES packet, time T_org of a reference source timeline is indicated. Furthermore, in the TEMI access unit, time T_ref which is a time corresponding to time T_org in the reference destination timeline is stored. A timeline is a reference clock used to transmit and receive streams. That is, on a common time axis, time T_org at the reference source and time T_ref at the reference destination are mutually equal times.

The TEMI access unit is transmitted with a reference source stream. A receiving device can synchronize and reproduce reference source content and reference destination content by analyzing the TEMI access unit.

FIG. 1A is a view illustrating a syntax of the TEMI access unit for describing a conventional problem.

As illustrated in FIG. 1A, the TEMI access unit (TEMI_AU) includes addon_location and timescale.

addon_location indicates reference destination location information (e.g., URL: Uniform Resource Locator).

timescale includes time_before_activation or media_time_anchor.

time_before_activation indicates a time required until addon_location becomes effective (i.e., becomes possible to obtain a reference destination).

media_time_anchor indicates time T_ref of the reference destination timeline.

Further, time T_org of the reference source timeline is indicated in a PTS field of a header of the PES packet in which the TEMI access unit is stored.

Figure 1B:
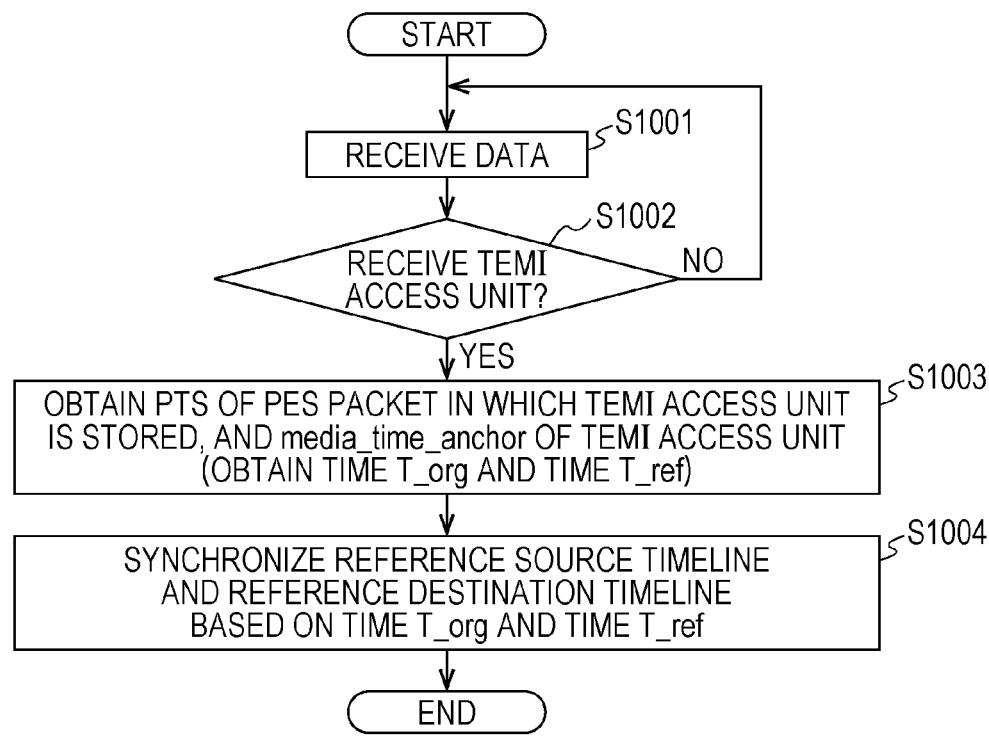
FIG. 1B is a flowchart illustrating processing in which a receiving device synchronizes a reference source timeline and a reference destination timeline by using the TEMI access unit.

FIG. 1B is a flowchart illustrating processing in which the receiving device synchronizes a reference source timeline and a reference destination timeline by using the TEMI access unit.

First, the receiving device receives data included in the reference source stream (step S1001). Next, the receiving device determines whether or not the received data is the TEMI access unit, i.e., whether or not the TEMI access unit has been received (step S1002). When it is determined that the TEMI access unit has not been received ("NO" in step S1002), the receiving device repeatedly executes processing from step S1001. On the other hand, when it is determined that the TEMI access unit has been received ("YES" in step S1002), the receiving device obtains a PTS of the PES packet in which the TEMI access unit is stored, and media_time_anchor in the TEMI access unit. That is, the receiving device obtains time T_org and time T_ref (step S1003). Next, the receiving device synchronizes the reference source timeline and the reference destination timeline based on time T_org and time T_ref (step S1004). Note that, synchronizing the reference source timeline and the reference destination timeline is to specify a correspondence relationship between these timelines, i.e., a time offset (i.e., offset value).

Figure 1C:
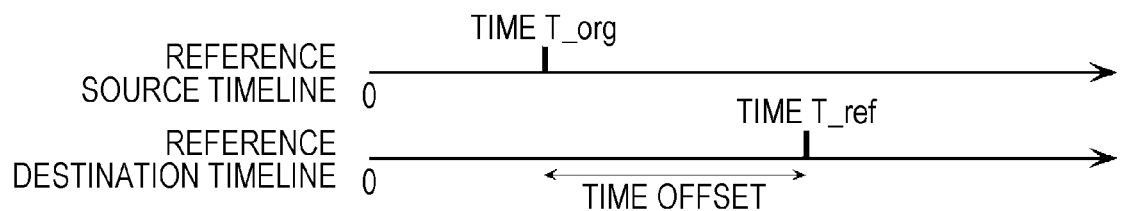
FIG. 1C is a view illustrating a relationship between time T_org and time T_ref in the reference source timeline and the reference destination timeline.

FIG. 1C is a view illustrating a relationship between time T_org and time T_ref in the reference source timeline and the reference destination timeline.

The receiving device specifies a difference between time T_org and time T_ref as the time offset (offset). This time offset is expressed as offset=T_ref−T_org×(timescale 2/timescale 1). Here, timescale 1 is a timescale of the reference source timeline, and timescale 2 is a timescale of the reference destination timeline. Note that, each timescale is a frequency which expresses a time and, more specifically, a number of times which is expressed per unit time (e.g. one second). When specifying such a time offset, the receiving device can calculate a time of the reference destination timeline corresponding to arbitrary time T of the reference source timeline according to T+offset.

However, this timeline extension has a problem that, every time a TEMI access unit is received, time T_org and time T_ref need to be analyzed, a processing amount related to management of time information upon synchronization and reproduction is large and processing is not efficient.

To solve this problem, a transmitting method according to one aspect of the present disclosure is a transmitting method for transmitting a first stream related to content of an image or audio, and the method including transmitting the first stream including timing update identification information indicating whether or not a correspondence relationship between a first reference clock and a second reference clock has been updated, the first reference clock being used to transmit and receive the first stream, and the second reference clock being used to transmit and receive a second stream related to another content to be reproduced in synchronization with content related to the first stream, a first time of the first reference clock, and a second time of the second reference clock, the second time being associated with the first time based on the updated correspondence relationship.

Thus, the timing update identification information is transmitted to the receiving device. Consequently, the receiving device can easily determine whether or not the correspondence relationship between the first reference clock and the second reference clock has been updated based only on this timing update identification information without making determination by performing analysis using the first time and the second time. As a result, only when it is determined that the correspondence relationship has been updated, the receiving device needs to specify the updated correspondence relationship by using the first time and the second time and, consequently, a processing amount of the receiving device can be suppressed. Consequently, it is possible to efficiently perform timeline extension.

For example, the transmitting method may further include determining whether or not the correspondence relationship has been updated, and generating the timing update identification information indicating a result of the determination.

Further, the determination of whether or not the correspondence relationship has been updated may include determining whether or not a discontinuous change is present in a change in a time indicated by the first reference clock, and determining, when it is determined that the discontinuous change is present, that the correspondence relationship has been updated.

Furthermore, the first reference clock may be a PCR (Program Clock Reference) according to MPEG2-TS (Moving Picture Experts Group-2 Transport Stream).

Still further, the transmitting method may include, when it is determined that the correspondence relationship has been updated: calculating an offset value corresponding to the updated correspondence relationship between the first reference clock and the second reference clock; and including, in the first stream, the first time and the second time that is specified based on the calculated offset value.

Moreover, the timing update identification information and the second time may be stored in a TEMI (Timeline and External Media Information) access unit of the first stream.

Moreover, the first time may be stored in a PES (Packetized Elementary Stream) packet in which the TEMI access unit is stored.

Further, the TEMI access unit may include a timeline descriptor and a location descriptor, and the transmitting method may include: storing the timing update identification information and the second time in the timeline descriptor; and storing location information in the location descriptor, the location information indicating a location of the content related to the second stream.

Furthermore, the transmitting method may further include: transmitting another location descriptor after the location descriptor is transmitted, the another location descriptor including splicing identification information and location information, the splicing identification information being used to stop reproduction of the content related to the second stream and start reproduction of content related to a third stream, and the location information indicating a location of the content related to the third stream; and retransmitting the location descriptor by a time when a reproduction period of the content related to the third stream ends.

Thus, another location descriptor is transmitted to the receiving device. Consequently, the receiving device can stop reproduction of content related to the second stream based on the splicing identification information stored in the another location descriptor, and reproduce the content related to the third stream. Further, the location descriptor in which the location information indicating a location of the content related to the second stream is stored is retransmitted to the receiving device by the time when a reproduction period (i.e., splice interval) of the content related to this third stream ends. Consequently, even when reception of the first stream is started in this reproduction period, at the end of this reproduction period, the receiving device can easily specify the content to be reproduced next and reproduce the content. That is, similar to a case where reception of the first stream is started before the reproduction period, the receiving device can resume reproduction of the content related to the source second stream, the content which has been reproduced before the content related to the third stream.

Further, a receiving method according to one aspect of the present disclosure is a receiving method for receiving a first stream related to content of an image or audio, the receiving method including receiving the first stream including timing update identification information indicating whether or not a correspondence relationship between a first reference clock and a second reference clock has been updated, the first reference clock being used to transmit and receive the first stream, and the second reference clock being used to transmit and receive a second stream related to another content to be reproduced in synchronization with content related to the first stream, a first time of the first reference dock, and a second time of the second reference dock, the second time being associated with the first time based on the updated correspondence relationship.

Thus, the timing update identification information is received by the receiving device. Consequently, the receiving device can easily determine whether or not the correspondence relationship between the first reference clock and the second reference clock has been updated based only on this timing update identification information without deliberately making determination by performing analysis using the first time and the second time. As a result, only when it is determined that the correspondence relationship has been updated, the receiving device needs to specify the updated correspondence relationship by using the first time and the second time and, consequently, a processing amount can be suppressed. Consequently, it is possible to efficiently perform timeline extension.

Note that these comprehensive or specific aspects may be realized by a system, a method, an integrated circuit, a computer program, or a recording medium such as a computer-readable CD-ROM, or may be realized by an arbitrary combination of systems, methods, integrated circuits, computer programs, or recording media.

Hereinafter, the exemplary embodiment will be more specifically described with reference to the drawings.

In addition, the exemplary embodiment described below indicates a comprehensive or specific example. Numerical values, shapes, materials, components, disposition positions and a connection mode of the components, steps and an order of the steps are exemplary, and do not intend to limit the present disclosure. Further, the components which are not recited in an independent claim representing the highest concept among the components according to the following exemplary embodiment will be described as arbitrary components.

Exemplary Embodiment

FIG. 2 is a view illustrating an example of a syntax of a TEMI access unit according to the present exemplary embodiment.

The TEMI access unit includes addon_location, timescale, media_time_anchor described above, and further includes is_timing_update which is timing update identification information id1.

The is_timing_update (id1) indicates that a correspondence relationship (e.g. time offset) between a reference source timeline and a reference destination timeline has been updated. That is, is_timing_update indicates that time T_org and time T_ref are stored in a PES packet after the correspondence relationship is updated. Note that the reference source timeline and the reference destination timeline will be referred to as both timelines. Further, media_time_anchor indicates time T_ref, and time T_org is indicated as a PTS in a header of a PES packet including this TEMI access unit.

For example, is_timing_update is a one-bit flag. Hence, in a case of is_timing_update=1, the is_timing_update indicates that the correspondence relationship between the both timelines has been updated. Further, in a case of is_timing_update=0, the is_timing_update indicates that the correspondence relationship between the both timelines has not been updated.

The correspondence relationship between the both timelines is updated in a period in which addon_location is effective. Hence, when a value of is_timing_update is set to 1, a value of is_announcement is set to 0 and a field of media_time_anchor is present.

The transmitting device sets is_timing_update to 1 only in the TEMI access unit transmitted immediately after the correspondence relationship between the both timelines is updated. Further, the transmitting device may set is_timing_update to 1 in a plurality of TEMI access units transmitted after the update. Furthermore, in order to notify the update in advance, the transmitting device may set is_timing_update to 1 in a plurality of TEMI access units before the update and in a TEMI access unit immediately after the update. In this case, the receiving device may determine that the correspondence relationship between the both timelines has been updated by determining that a value of is_timing_update has changed from 1 to 0.

The transmitting device may set a timescale of the reference destination timeline to "timescale" of the TEMI access unit. Thus, the transmitting device can use a value of media_time_anchor as time information of the reference destination timeline without converting the timescale.

For example, when a reference source is transmitted according to MPEG2-TS and a reference destination is transmitted according to MPEG-DASH, a TEMI access unit is multiplexed on a TS. Further, the reference source may be transmitted according to MPEG2-TS, the reference destination may be transmitted as an MMT stream, the reference source and the reference destination may be transmitted according to MPEG2-TS, or another combination of the reference source and the reference destination may be transmitted.

Furthermore, the transmitting device may transmit a TEMI access unit as another stream without multiplexing the reference source stream with a TEMI access unit.

The transmitting device updates the correspondence relationship between the reference source timeline and the reference destination timeline in, for example, following cases (cases 1 and 2).

That is, the transmitting device updates the correspondence relationship when discontinuity occurs in a reference source reference clock (case 1). For example, the transmitting device updates the correspondence relationship when discontinuity occurs in a PCR (Program Clock Reference) according to MPEG2-TS.

Alternatively, the transmitting device updates the correspondence relationship when discontinuity occurs in a reference destination reference clock (case 2). For example, the transmitting device updates the correspondence relationship when part of MP4 Fragment is skipped according to reference destination MPEG-DASH. Alternatively, the transmitting device updates the correspondence relationship when discontinuity occurs in a PCR according to reference destination MPEG2-TS. Alternatively, the transmitting device updates the correspondence relationship when discontinuity occurs in a value of an NTP (Network Time Protocol) which is the reference clock according to reference destination MMT.

In addition, in case 2, occurrence of discontinuity in the reference destination reference clock and a displacement amount of the reference clock are notified to the transmitting device which transmits a reference source stream.

Next, a method for setting media_time_anchor will be described.

For example, according to MPEG-DASH, data is received from a middle segment of segmentalized content in some cases. In this case, when a PTS of a head access unit in a display (reproduction) order in each segment or a period of MPEG-DASH complies with a timeline (zero timeline) which sets a head of content to zero, it is possible to use this timeline. Meanwhile, when each segment or a PTS complies with a timeline (referred to as a segment timeline) which sets to zero a PTS of a head access unit in a segment or the like which starts being received, media_time_anchor is also set according to the segment timeline.

In this case, an index number or the like for specifying a segment which serves as a reference of a segment timeline may be stored in a descriptor in a PMT (Program Map Table) in which a TEMI access unit or a PID (packet identifier) of a stream of the TEMI access unit is stored. Note that, when the segment timeline is used, it is necessary to obtain in advance a time of the reference source timeline which matches with a time at which a time of the segment timeline becomes zero.

In a case of a format in which a reference dock is defined such as MPEG2-TS, MMT, or a RTP (Real-time Transport Protocol), a value of media_time_anchor is set according to the reference dock to be used. The reference dock is defined by a PCR according to MPEG2-TS, and the reference clock is defined by an NTP (Network Time Protocol) according to MMT and RTP.

Figure 3:
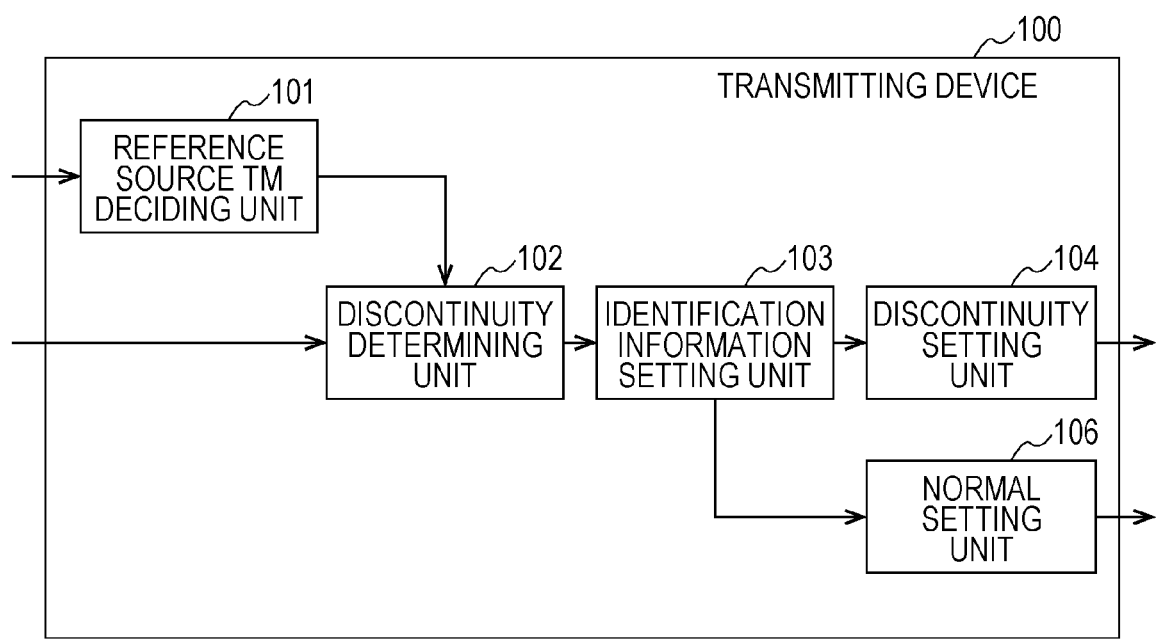
FIG. 3 is a block diagram illustrating a configuration of a transmitting device according to the exemplary embodiment.

FIG. 3 is a block diagram illustrating a configuration of the above transmitting device according to the present exemplary embodiment.

Transmitting device 100 according to the present exemplary embodiment includes reference source TM deciding unit 101, discontinuity determining unit 102, identification information setting unit 103, discontinuity setting unit 104, and normal setting unit 106.

Reference source TM determining unit 101 determines time T_org of the reference source. Discontinuity determining unit 102 determines whether or not discontinuity has occurred in the reference source timeline. Identification information setting unit 103 sets is_timing_update which is timing update identification information id1 described above. When the correspondence relationship between the both timelines is updated, discontinuity setting unit 104 sets time T_ref of the reference destination timeline to a TEMI access unit according to the updated correspondence relationship. When the correspondence relationship between the both timelines is not updated, normal setting unit 106 sets time T_ref of the reference destination timeline to a TEMI access unit according to the correspondence relationship which has been used so far.

Figure 4:
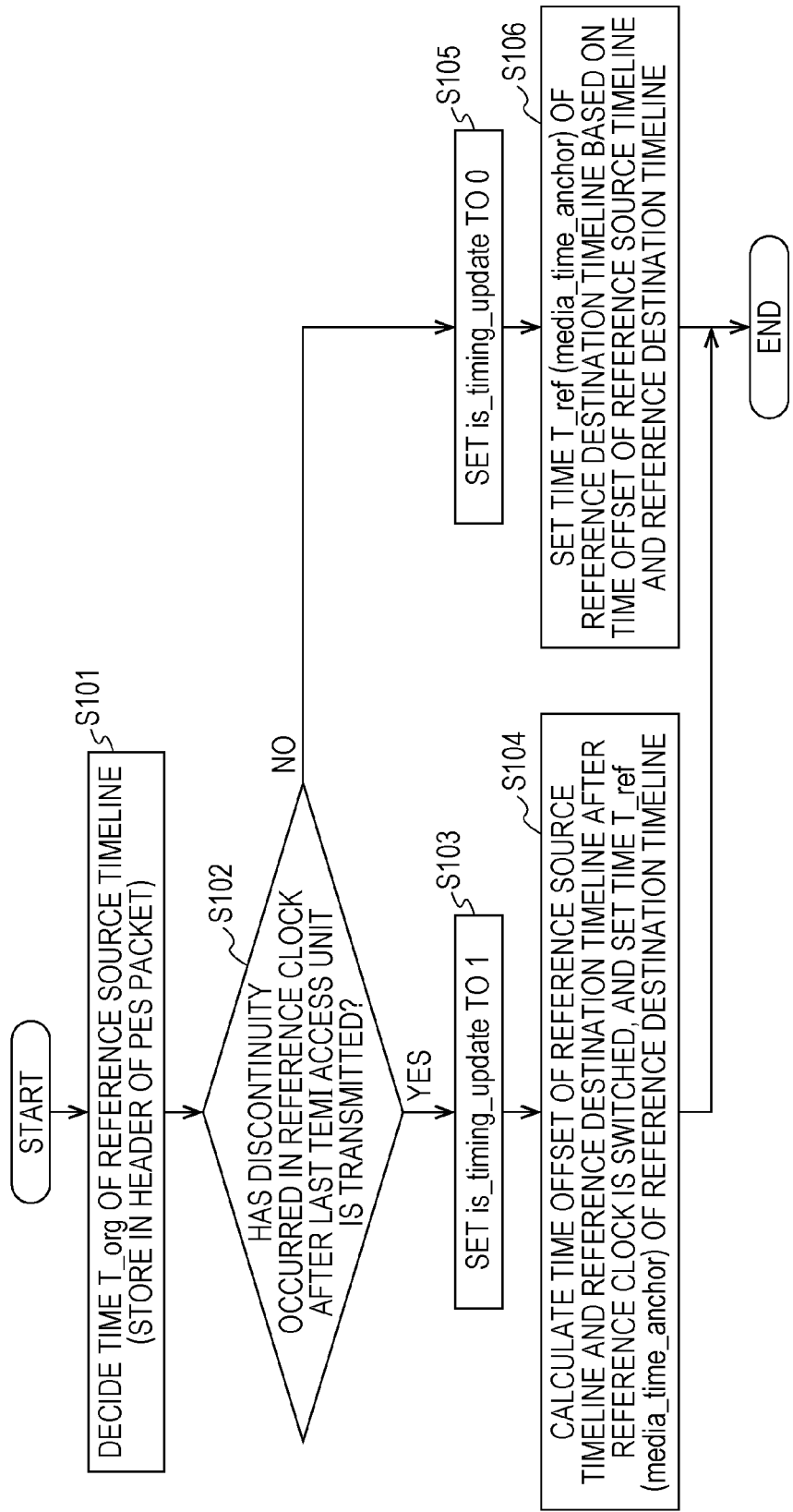
FIG. 4 is a flowchart illustrating an example of a processing operation of the transmitting device according to the exemplary embodiment.

FIG. 4 is a flowchart illustrating an example of a processing operation of transmitting device 100 according to the present exemplary embodiment.

A case where the reference source stream is transmitted according to MPEG2-TS will be described with reference to FIG. 4.

First, reference source TM deciding unit 101 of transmitting device 100 decides time T_org of the reference source timeline, and stores time T_org in a header of a PES packet in which a TEMI access unit is stored (step S101).

Next, discontinuity determining unit 102 determines whether or not discontinuity has occurred in a PCR which is the reference clock after the last TEMI access unit is transmitted (step S102). When it is determined that the discontinuity has occurred in the PCR ("YES" in step S102), identification information setting unit 103 sets a flag of is_timing_update of the TEMI access unit to 1 (step S103). Further, discontinuity setting unit 104 calculates a time offset after the reference clock is switched, and sets time T_ref (media_time_anchor) of the reference destination timeline based on this time offset (step S104).

On the other hand, when it is determined that the discontinuity has not occurred in the PCR ("NO" in step S102), identification information setting unit 103 sets a flag of is_timing_update of the TEMI access unit to 0 (step S105). Further, normal setting unit 106 sets time T_ref (media_time_anchor) of the reference destination timeline based on the time offset which has been used so far (step S106).

Discontinuity determining unit 102 may directly obtain a PCR from means which generates the PCR, or may analyze a TS packet in which the PCR is stored. In a latter case, when a field (discontinuity_indicator) indicating whether or not discontinuity has occurred in the PCR of the header of the TS packet is set to 1, discontinuity determining unit 102 determines that the discontinuity has occurred. Alternatively, when discontinuity_indicator is continuously set to 1 prior to the occurrence of the discontinuity, a value of the updated PCR is stored in a last TS packet in which the value of the discontinuity is 1. Accordingly, discontinuity determining unit 102 may determine that the discontinuity has occurred when this last TS packet is received.

Transmitting device 100 may transmit a TEMI access unit per audio or video access unit (hereinafter referred to as an AV access unit) multiplexed on the reference source stream, or may cyclically transmit a TEMI access unit such that a transmission interval is a predetermined value or less.

When the TEMI access unit is transmitted per AV access unit, transmitting device 100 may set a PTS of a header of a PES packet such that the PTS of the header of the PES packet in which the TEMI access unit is stored is equal to a PTS of the AV access unit.

In this case, transmitting device 100 may transmit the TEMI access unit temporally in advance compared to the AV access unit corresponding to this TEMI access unit. Thus, the receiving device can obtain a time of the reference destination timeline corresponding to the PTS of this AV access unit before the AV access unit is obtained.

Further, when the TEMI access unit is cyclically transmitted, transmitting device 100 may set a PTS of a PES packet such that the PTS of the PES packet in which the TEMI access unit is stored is equal to a PTS of the AV access unit. Furthermore, in the case where a correspondence relationship between the reference source timeline and the reference destination timeline has been updated, transmitting device 100 transmits a TEMI access unit corresponding to a PTS of an access unit immediately after the update without waiting for a timing to transmit a next TEMI access unit.

Transmitting device 100 which transmits the reference source stream may obtain information of a reference destination timeline from a transmitting device which transmits a reference destination stream by using means which is not illustrated. For example, when reference source content includes a main part and CMs (commercials), and reference destination content includes only a main part which is reproduced in synchronization with the main part of the reference source, reproduction of the reference destination content is desirably stopped in an interval in which the CMs of the reference source content are reproduced. In such a case, transmitting device 100 may advance only the reference source timeline and stop the reference destination timeline.

That is, transmitting device 100 updates time T_org in the CM reproduction period, and continues to set, to subsequent time T_ref, a value of time T_ref which comes immediately before a generation interval of the CMs. After the CM reproduction period ends, transmitting device 100 updates time T_org and time T_ref together as usual. In this case, transmitting device 100 desirably transmits a TEMI access unit associated with each PTS per AV access unit of the reference source stream. Further, transmitting device 100 may store, in the TEMI access unit, identification information indicating that the reference destination timeline or the reference destination timeline stops. Alternatively, transmitting device 100 may insert a non-reproduction period in the reference destination content in the CM reproduction period without stopping the reference destination timeline. For example, transmitting device 100 can generate a non-reproduction period by using a function of "empty edit" in MP4. This method is applicable not only to CMs but also to a case where an interval which is not a target of synchronization and reproduction of the reference source and the reference destination is present.

Thus, the transmitting method according to the present exemplary embodiment is a transmitting method for transmitting a first stream related to content of an image or audio, and includes transmitting a first stream including, for example, timing update identification information id1 such as is_timing_update illustrated in FIG. 2, the first time (corresponding to time T_org described above) and the second time (corresponding to time T_ref described above). Timing update identification information id1 indicates whether or not a correspondence relationship between a first reference clock and a second reference clock has been updated, the first reference clock being used to transmit and receive the first stream, and the second reference clock being used to transmit and receive a second stream related to another content to be reproduced in synchronization with content related to the first stream. Further, the first time is a time of the first reference clock, and a second time is a time of the second reference clock, the second time being associated with the first time based on the updated correspondence relationship.

Thus, timing update identification information id1 is transmitted to the receiving device. Consequently, the receiving device can easily determine whether or not the correspondence relationship between the first reference clock and the second reference clock has been updated based only on timing update identification information id1 without making determination by performing analysis using the first time and the second time. As a result, only when it is determined that the correspondence relationship has been updated, the receiving device needs to specify the updated correspondence relationship by using the first time and the second time and, consequently, a processing amount of the receiving device can be suppressed. Consequently, it is possible to efficiently perform timeline extension.

Further, the transmitting method according to the present exemplary embodiment includes determining whether or not the correspondence relationship has been updated, and generating timing update identification information id1 indicating a result of the determination. Furthermore, the determination of whether or not the correspondence relationship has been updated includes determining whether or not a discontinuous change is present in a change in a time indicated by the first reference clock, and determining, when it is determined that the discontinuous change is present, that the correspondence relationship has been updated, as shown in step S102 in FIG. 4. Still further, the first reference clock is, for example, a PCR according to MPEG2-TS. Moreover, the transmitting method according to the present exemplary embodiment includes calculating an offset value (i.e., time offset) corresponding to the updated correspondence relationship between the first reference clock and the second reference clock, as shown in step S104 in FIG. 4, when it is determined that the correspondence relationship has been updated. Further, the first time and the second time that is specified based on the calculated offset value are included in the first stream. More specifically, timing update identification information id1 and the second time are stored in the TEMI access unit of the first stream, and the first time is stored in the header of the PES packet in which the TEMI access unit is stored.

Figure 5:
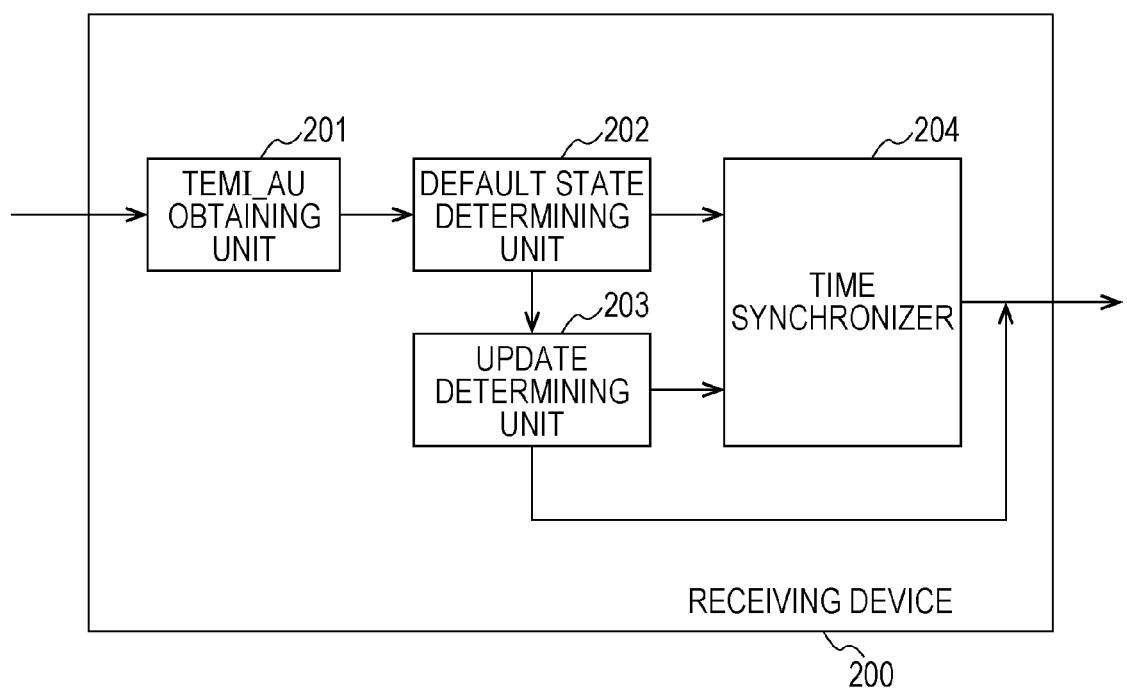
FIG. 5 is a block diagram illustrating a configuration of a receiving device according to the exemplary embodiment.

FIG. 5 is a block diagram illustrating a configuration of the receiving device according to the present exemplary embodiment.

Receiving device 200 includes TEMI_AU obtaining unit 201, default state determining unit 202, update determining unit 203 and time synchronizer 204.

TEMI_AU obtaining unit 201 obtains a TEMI access unit. Default state determining unit 202 determines whether or not synchronizing of both timelines has been finished before decoding of content starts. Update determining unit 203 determines whether or not a correspondence relationship between the both timelines has been updated. Time synchronizer 204 performs time synchronization processing described below on the both timelines.

FIG. 6 is a flowchart illustrating an example of a processing operation of receiving device 200 according to the present exemplary embodiment.

First, TEMI_AU obtaining unit 201 of receiving device 200 obtains a TEMI access unit (step S201). Next, before decoding of content is started, default state determining unit 202 determines whether or not synchronizing of the reference source timeline and the reference destination timeline has been finished (step S202). Note that, when decoding of content is started, it is necessary to synchronize the reference source timeline and the reference destination timeline.

In step S202, when it is determined that the synchronization has been finished ("YES" in step S202), update determining unit 203 determines whether or not timing update identification information id1 (is_timing_update=1) indicating that the correspondence relationship between the reference source timeline and the reference destination timeline has been updated has been set to the TEMI access unit (step S203).

When it is determined in step S202 that the synchronization has not been finished ("NO" in step S202) or it is determined in step S203 that timing update identification information id1 has been set ("YES" in step S203), time synchronizer 204 performs time synchronization processing on the reference source timeline and the reference destination timeline.

The time synchronization processing is to associate a time between the reference source timeline and the reference destination timeline. When, for example, time T_org of the reference source timeline matches with time T_ref of the reference destination timeline, time synchronizer 204 associates arbitrary time t1 of the reference source timeline and time t2 of the reference destination timeline according to the following (Equation 1).

$$t2 = t1 \times (timescale2/timescale1) + (T\_ref - (T\_org \times timescale2/timescale1))$$ (Equation 1)

Receiving device 200 synchronizes and reproduces an access unit of the reference source stream and an access unit of the reference destination stream based on (Equation 1).

Not only when the correspondence between the timelines has been updated but also when the correspondence relationship has not been updated, receiving device 200 may perform time synchronization processing in step S204. For example, receiving device 200 may cyclically perform the time synchronization processing.

Further, when timing update identification information id1 is not stored in the TEMI access unit, receiving device 200 may determine whether or not the reference clock has been updated according to another method, and may perform the time synchronization processing when it is determined that the reference clock has been updated.

For example, when the reference source stream is transmitted according to MPEG2-TS, receiving device 200 determines the update (discontinuity) of the reference clock based on a value of discontinuity_indicator of a TS packet in which a PCR is stored. Further, receiving device 200 performs the time synchronization processing when it is determined that the discontinuity has occurred. Alternatively, receiving device 200 may cyclically obtain a TEMI access unit and perform the time synchronization processing without making determination on the update of the reference clock.

Thus, the receiving method according to the present exemplary embodiment is a receiving method for receiving a first stream related to content of an image or audio, and includes receiving a first stream including, for example, timing update identification information id1 such as is_timing_update shown in FIG. 2, the first time (corresponding to time T_org) and the second time (corresponding to time T_ref). Timing update identification information id1 indicates whether or not a correspondence relationship between a first reference clock and a second reference clock has been updated, the first reference clock being used to transmit and receive the first stream, and the second reference clock being used to transmit and receive a second stream related to another content to be reproduced in synchronization with content related to the first stream. Further, the first time is a time of the first reference dock, and a second time is a time of the second reference clock, the second time being associated with the first time based on the updated correspondence relationship.

Thus, timing update identification information id1 is received by receiving device 200. Consequently, receiving device 200 can easily determine whether or not the correspondence relationship between the first reference clock and the second reference clock has been updated based only on timing update identification information id1 without deliberately making determination by performing analysis using the first time and the second time. As a result, only when it is determined that the correspondence relationship has been updated, the receiving device needs to specify the updated correspondence relationship by using the first time and the second time and, consequently, a processing amount can be suppressed. Consequently, it is possible to efficiently perform timeline extension.

That is, the receiving method according to the present exemplary embodiment includes determining whether or not the correspondence relationship has been updated based on timing update identification information id1 included in the first stream, as shown in step S203 in FIG. 6. Further, when it is determined that the correspondence relationship has been updated, the time synchronization processing is performed as shown in step S204 in FIG. 6. That is, the updated correspondence relationship is specified based on the first time and the second time included in the first stream. Further, content related to the first stream and content related to the second stream are synchronized and reproduced based on the updated correspondence relationship. Furthermore, when the updated correspondence relationship is specified, timescales of the first and second reference clocks are represented by Ts1, Ts2, respectively, and the first and second times are represented by T_org, T_ref, respectively, and an arbitrary time of the first reference clock is represented by t. In this case, the updated correspondence relationship is specified by associating a time of the second reference clock calculated according to $t \times (Ts2/Ts1) + (T\_ref - (T\_org \times Ts2/Ts1))$ with the time t of the first reference clock. Note that, Ts1, Ts2 correspond to timescale 1, timescale 2 in (Equation 1).

Modified Example 1

Modified examples of the present exemplary embodiment will be described below.

Transmitting device 100 may describe access information (e.g. URL) in addon_location of a TEMI access unit to obtain content management information. The management information is, for example, MPD (Media Presentation Description) according to MPEG-DASH or configuration information of a package (an asset which configures the package or a URL for obtaining an asset) according to MMT.

When, for example, a reference destination stream is transmitted according to MPEG-DASH, receiving device 200 first obtains from addon_location of the TEMI access unit a URL for accessing an MPD according to MPEG- DASH. Then, receiving device 200 accesses this URL, obtains the MPD, and starts obtaining content of MPEG-DASH.

Furthermore, when a reference destination stream is transmitted according to an RTP, one encoded data of video or audio is generally transmitted by using one RTP stream. Hence, transmitting device 100 may describe a URL for accessing content management information in which a plurality of RTP streams such as videos or audios are collected.

Alternatively, when a reference source stream is transmitted according to MPEG2-TS, transmitting device 100 may store management information of reference destination content by using a descriptor of a PMT indicating a PID of a stream of a TEMI access unit. In this case, transmitting device 100 may set a flag of has_location to 0, refer to the PMT and store the management information of the reference destination content without storing addon_location.

Transmitting device 100 may store management information as a descriptor related to a TEMI access unit, in a second loop of the PMT. Alternatively, transmitting device 100 may store information indicating presence or absence of reference destination content, in a descriptor of a first loop of the PMT, and store management information of reference destination content in the second loop when the reference destination content is present.

Further, when reference source content and reference destination content have a dependence relationship, transmitting device 100 may store information indicating the dependence relationship, in the PMT indicating information of a TEMI access unit. When reference source content is transmitted according to MPEG2-TS, the reference source content and a PID of a TEMI access unit are indicated by an identical PMT. When, for example, reference destination content includes extension data of reference source content, it is possible to extend a time (e.g. frame rate), a space (e.g. resolution), and a bit depth by decoding extension data. More specifically, it is possible to increase the frame rate from 60 fps to 120 fps or increase the resolution from 1920×1080 pixels to 3840×2160 pixels. In such a case, the reference destination content is extension data, and transmitting device 100 may store, in the PMT, information indicating what type of extension can be performed. Further, transmitting device 100 may store, in the PMT, information indicating display positions of reference source content and reference destination content.

Alternatively, when specific data of reference source content and reference destination content have a dependence relationship, transmitting device 100 may store, in the PMT, information indicating which items of data have the dependence relationship. For example, the reference source content includes audio and video, and the reference destination content includes caption data associated with the video of the reference source content. In this case, transmitting device 100 may indicate that the video of the reference source content and the reference destination content are associated. That is, transmitting device 100 associates a PID of a TS packet in which video is stored, and a PID of a TS packet in which a TEMI access unit is stored. Alternatively, transmitting device 100 may indicate a PID of a TS packet in which the associated video is stored as relevant data in management information of the reference destination content.

The information may be stored in the management information of the reference destination content obtained according to addon_location.

Receiving device 200 obtains content management information or a dependence relationship between items of reference source content and reference destination content based on the above information, and reproduces these items of content.

Second Modified Example

FIGS. 7A to 7C are views each illustrating a syntax of a TEMI access unit according to the present modified example.

The TEMI access unit includes a descriptor (temi_descriptor) as illustrated in FIG. 7A. This descriptor (temi_descriptor) includes a timeline descriptor (temi_timeline_descriptor) illustrated in FIG. 7B, and location descriptor (temi_location_descriptor) illustrated in FIG. 7C.

The timeline descriptor illustrated in FIG. 7B is a descriptor indicating a correspondence relationship between both timelines, and includes information related to a reference destination timeline. is_timing_update which is timing update identification information id1 is stored in this timeline descriptor.

The location descriptor illustrated in FIG. 7C is a descriptor indicating information related to a location of reference destination content.

That is, in a TEMI access unit, a correspondence relationship between timelines of content transmitted according to reference source MPEG2-TS and reference destination content, and location information of the reference destination content are described in different formats of descriptors.

A characteristic element of the location descriptor will be described below. force_reload is a flag indicating whether entity data of reference destination content or content management information needs to be obtained again. This management information is content management information such as an MPD according to MPEG-DASH which is reference destination.

is_announcement is a flag indicating whether or not the reference destination content can be obtained. When this flag is set to 1, timescale is indicated, and a time required until the reference destination content can be obtained is indicated in time_before_activation.

addon_location is location information (e.g. URL) indicating a location of the reference destination content.

splicing_flag is splicing identification information for instructing splicing of items of content, and is a flag indicating reproduction and stop of the reference destination content. That is, when this flag is set to 1, reproduction of the reference destination content indicated in a descriptor to which this flag is not set is interrupted, and the reference destination content indicated in a descriptor to which this flag is set is reproduced. For example, in location descriptor A, splicing_flag=0 is set, and reference destination content A is indicated. For example, in location descriptor B, splicing_flag=1 is set, and reference destination content B is indicated. In this case, when location descriptor B is received in a state where reference destination content A is reproduced, receiving device 200 interrupts the reproduction of reference destination content A and reproduces reference destination content B. Receiving device 200 resumes reproduction of reference destination content A after finishing reproduction of reference destination content B.

media_timestamp or npt corresponds to media_time_anchor described above, and indicates time T_ref in the reference destination timeline.

Next, a random access in a stream including the TEMI access unit (referred to as a TEMI stream below) will be described.

FIG. 8A is a view for describing a random access performed by receiving device 200. Receiving device 200 obtains and analyzes a location descriptor, and obtains and reproduces the reference destination content. More specifically, as illustrated in FIG. 8A, receiving device 200 obtains location descriptor A at time T0, and starts reproduction of content A indicated by this location descriptor A. Subsequently, receiving device 200 obtains location descriptor B at time T1. In location descriptor B, splicing_flag is set to 1. Hence, receiving device 200 interrupts reproduction of content A, and starts reproduction of content B indicated by location descriptor B. A splice interval which is a reproduction period of content B ends at time T2. Hence, receiving device 200 resumes reproduction of content A after time T2.

Location descriptor A is cyclically transmitted from time T0, and location descriptor B is cyclically transmitted from time T1. Further, a splice interval is an interval in which content indicated by a location descriptor in which splicing_flag is set to 1 is reproduced.

In this case, receiving device 200 performs a random access. For example, receiving device 200 starts reception from time T at which location descriptor B is transmitted. In this case, receiving device 200 receives location descriptor B. As a result, receiving device 200 starts reproduction of content B. However, in this case, receiving device 200 does not receive location descriptor A and therefore cannot specify content whose reproduction is to be resumed after the reproduction of content B is finished.

Hence, in the present modified example, transmitting device 100 transmits a location descriptor indicating content which is reproduced immediately after the splice interval, at an end time of the splice interval, or before the end time. Thus, even when receiving device 200 cannot obtain a location descriptor transmitted immediately before a location descriptor in which splicing_flag has been set to 1, receiving device 200 can specify and reproduce source content whose reproduction is to be resumed after the splice interval ends.

In the example illustrated in FIG. 8A, transmitting device 100 retransmits location descriptor A at time T2. When transmitting location descriptor A before the end time of the splice interval, transmitting device 100 may set a flag of is_announcement to 1, and indicate in location descriptor A that content A can be obtained from time T2. is_announcement is originally a flag indicating a time at which content can be obtained, but is_announcement may indicate a reproduction start time of reference destination content whose reproduction is resumed after the splice interval. An access unit whose reproduction is started is determined based on a DTS (Decoding Time Stamp) or a PTS per access unit in the reference destination content.

In this case, when the reference source timeline and the reference destination timeline are different, receiving device 200 performs time synchronization processing on both timelines based on synchronization information of a timeline obtained from temi_timeline_descriptor (e.g. timescale and media_timestamp). Further, transmitting device 100 may set a flag of force_reload to 0 in a location descriptor to be retransmitted. Thus, when retransmitted location descriptor A is received, receiving device 200 which has already obtained location descriptor A can determine that it is not necessary to obtain the reference destination content again.

Transmitting device 100 may store, in a location descriptor to be retransmitted, information indicating content which is reproduced immediately after a splice interval or information indicating contents whose contents of a location descriptor have already been transmitted. Further, transmitting device 100 may indicate more significant information in a descriptor indicating an attribute of a TEMI stream. This significant information is information indicating that, even when reception starts from an arbitrary TEMI access unit, reference destination content indicated by a TEMI access unit whose reception has been started, and reference destination content which temporally comes later can be uniquely decided by retransmitting a location descriptor.

The example illustrated in FIG. 8A is an ideal example in which reproduction of reference destination content can be started immediately after a location descriptor is obtained. However, actually, until content is obtained and starts being reproduced after a location descriptor is obtained, a time lag occurs depending on a bandwidth or a congestion situation of a communication network.

FIG. 8B is a view for describing processing operations of transmitting device 100 and receiving device 200 when a time lag is taken into account.

When, for example, location descriptor A is obtained at time T0, receiving device 200 starts reproduction of content A at time S0. Further, transmitting device 100 may transmit a location descriptor by taking into account a time lag which occurs until reproduction of reference destination content is started after the location descriptor is obtained. That is, transmitting device 100 starts transmitting temi_location_descriptor prior to a time corresponding to a DTS or a PTS of a head access unit of reference destination content. For example, when the DTS of the head access unit of the reference destination content is converted into a value of a PCR according to reference source MPEG2-TS, the value takes 1000000 and a time lag is 600000. In this case, transmitting device 100 transmits temi_location_descriptor at or before a time at which the PCR value corresponds to 400000. Thus, it is assured that receiving device 200 reproduces reference destination content from time 1000000.

Next, a random access point of a TEMI stream including the TEMI access unit will be described.

Receiving device 200 needs to be able to obtain information related to reference destination content, and more specifically, needs to obtain this information immediately after a reception starting operation of selecting a channel for broadcasting or performing communication. For example, in a case of broadcasting, receiving device 200 obtains a PID of a TEMI stream indicated by a PMT of a program to be received, and starts reception of a TEMI stream. Hence, transmitting device 100 desirably cyclically transmits a timeline descriptor and a location descriptor of a TEMI access unit similarly to a PMT of MPEG2-TS for broadcasting.

A location descriptor only needs to be transmitted to receiving device 200 when contents of the location descriptor are updated. This is because, analyzing a location descriptor of the same contents every time a TEMI access unit is received leads to an increase in a processing load of receiving device 200.

A timeline descriptor only needs to be transmitted depending on a frequency at which timelines of reference source content and reference destination content are synchronized by receiving device 200, and basically only needs to be transmitted when discontinuity occurs in a PCR.

Hence, transmitting device 100 may signal to receiving device 200 that the contents of the location descriptor have been updated. For example, transmitting device 100 performs signaling by providing a counter indicating a version number to a location descriptor. Alternatively, transmitting device 100 performs signaling by setting random_access_indicator in a header of a TS packet. Further, transmitting device 100 may provide a new flag to a reserved area immediately after CRC_flag in a TEMI access unit. In this case, when random_access_indicator is used, transmitting device 100 sets random_access_indicator to 1. More specifically, transmitting device 100 sets random_access_indicator in a header of a TS packet including head data of a TEMI access unit including the updated location descriptor. For example, a value of splicing_flag, a value of force_reload, or reference destination content indicated by a setting of new location_id is changed as contents of a location descriptor.

In this case, receiving device 200 obtains reference destination content based on contents of a TEMI access unit received immediately after channel selection for broadcasting, associates timelines of reference source content and reference destination content, and starts reproduction of the reference destination content. After the reproduction starts, receiving device 200 determines whether or not the contents of the location descriptor have been updated based on a value of random_access_indicator, and switches the reference destination content based on the updated contents in a case where the contents have been updated. Meanwhile, receiving device 200 monitors a value of discontinuity_indicator of a header of a TS packet, and determines whether or not discontinuity has occurred in a PCR. Receiving device 200 refers to a timeline descriptor in the TEMI access unit, and tries again to associate (i.e., synchronize) both timelines when the discontinuity occurs in the PCR. That is, a head location descriptor or a TEMI access unit including a location descriptor which is transmitted first after contents are updated may be a random access point.

Further, the TEMI access unit includes only one of a timeline descriptor and a location descriptor and does not include a descriptor obtained by receiving device 200 in some cases. In this case, receiving device 200 continues to obtain a TEMI access unit until a TEMI access unit included in an obtaining target descriptor can be received.

A random access point may be defined as follows.

As described with reference to the example in FIG. 8A, when reception of a TEMI access unit in a splice interval is started, content which is reproduced immediately after the splice interval cannot be obtained in some cases. That is, when reception is started from an arbitrary TEMI access unit (AU(i)) and when information for obtaining content which is reproduced immediately after reference destination content indicated by (AU(i)) is indicated only in a TEMI access unit whose transmission order comes before (AU(i)), (AU(i)) does not become a random access point. Hence, when the information for obtaining content which is reproduced immediately after the reference destination content indicated by (AU(i)) is stored in a TEMI access unit whose transmission order comes after (AU(i)), this (AU(i)) may be a random access unit.

FIG. 9 is a flowchart illustrating an example of a processing operation of receiving device 200 according to the present modified example.

First, receiving device 200 analyzes a timeline descriptor and a location descriptor of a TEMI access unit received immediately after channel selection. Thus, receiving device 200 specifies the reference destination content, and obtains information necessary for associating timelines of the reference destination content and reference source content (step S301). Next, receiving device 200 receives the reference destination content, and starts synchronizing and reproducing the reference destination content and the reference source content (step S302).

Next, receiving device 200 determines whether or not contents of a location descriptor have been updated (step S303). In this case, when it is determined that the contents have been updated ("YES" in step S303), receiving device 200 switches the reference destination content or changes a URL of the reference destination content according to the updated contents. Thus, receiving device 200 obtains the updated reference destination content (step S304).

Next, receiving device 200 determines whether or not discontinuity of a PCR has occurred (step S305). In this case, when it is determined that the discontinuity has occurred ("YES" in step S305), receiving device 200 refers to a timeline descriptor, and synchronizes again timelines of the time reference source content and the reference destination content (step S306).

Receiving device 200 may not execute steps S303, S304, or may not execute steps S305, S306. That is, receiving device 200 may execute one of processing including steps S303, S304 and processing including steps S305, S306.

Thus, according to the transmitting method according to the present exemplary embodiment, a TEMI access unit includes a timeline descriptor and a location descriptor. Further, the timeline descriptor stores timing update identification information id1 and a second time, and the location descriptor stores location information (e.g. URL) indicating a location of content related to a second stream. Furthermore, the transmitting method according to the present exemplary embodiment further includes transmitting another location descriptor including splicing identification information (e.g. splicing_flag) for stopping reproduction of content related to the second stream and starting reproduction of content related to a third stream, and location information (e.g., URL) indicating a location of the content related to the third stream after the location descriptor is transmitted. Still further, the location descriptor is retransmitted by a time when a reproduction period of the content related to the third stream ends. For example, the location descriptor, the another location descriptor, the content related to the second stream, and the content related to the third stream correspond to location descriptor A, location descriptor B, content A, and content B illustrated in FIGS. 8A and 8B, respectively.

Meanwhile, a receiving method according to the present exemplary embodiment includes stopping reproduction of content related to the second stream and starting reproduction of content related to a third stream when a first descriptor including splicing identification information (e.g. splicing_flag) instructing splicing of items of content and location information indicating the content related to the third stream are received. Further, reproduction of the content related to the second stream is resumed after a reproduction period ends when a second descriptor including location information indicating a location of the content related to the second stream is received by the time when the reproduction period of the content related to the third stream ends. For example, the first descriptor, the second descriptor, the content related to the second stream, and the content related to the third stream correspond to location descriptor B, location descriptor A, content A, and content B illustrated in FIGS. 8A and 8B, respectively.

Thus, the another location descriptor is transmitted as the first descriptor to the receiving device. Consequently, receiving device 200 can stop reproduction of the content related to the second stream based on the splicing identification information stored in the another location descriptor, and reproduce the content related to the third stream. Further, the location descriptor which stores the location information indicating a location of the content related to the second stream is retransmitted as the second descriptor to receiving device 200 by the time when a reproduction period of the content related to the third stream ends. Consequently, even when reception of the first stream is started in this reproduction period, at the end of the reproduction period, receiving device 200 can easily specify the content to be reproduced next and reproduce the content. That is, similar to a case where reception of the first stream which is the reference source stream is started before this reproduction period, receiving device 200 can resume reproduction of the content related to the source second stream, the content which has been reproduced before the content related to the third stream.

Third Modified Example

Hereinafter, a reproduction method in a splice interval will be described.

Upon timeline extension, when temi_location_descriptor to which splicing_flag indicating 1 has been set is received, a receiving device interrupts reproduction of content which has been reproduced so far. Further, the receiving device reproduces reference destination content in which splicing_ flag has been set to 1. However, when reference destination content is transmitted according to MPEG-DASH, MMT, or MPEG2-TS, a DTS or a PTS of an access unit of reference destination content is indicated in a stream such as MPEG-DASH or MMT. Hence, the receiving device cannot uniquely decide an operation particularly when splicing_flag is set.

Hence, according to the present modified example, the following transmitting method and receiving method can be used to uniquely decide an operation of reproducing reference destination content in a splice interval. In this case, a format which does not indicate an absolute value of a DTS or a PTS of an access unit as in MP4 will be referred to as a relative time type format. Further, a format which indicates an absolute value of a DTS or a PTS of an access unit as in MPEG-DASH or MMT will be referred to as an absolute time type format.

According to the relative time type format, a DTS or a PTS indicated in a header of a PES packet in which a TEMI access unit including temi_location_descriptor indicating reference destination content is stored is handled as time information of a head access unit of the reference destination content. In this case, upon receipt of temi_location_descriptor, receiving device 200 decides time information based on a header (a DTS or a PTS) of a PES packet in which a corresponding TEMI access unit is stored. Hence, for example, when starting reproduction of reference destination content from a time at which a PCR value takes 90000, and cyclically transmitting a TEMI access unit, transmitting device 100 sets to 90000 a PTS value of a header included in the PES packet.

Meanwhile, according to the absolute time type format, time information of an access unit is indicated in a header in the format as a value based on a reference clock in each format. The reference clock is an NTP value according to MPEG-DASH or MMT, and is a PCR value according to MPEG2-TS. Receiving device 200 reproduces reference destination content according to time information of an access unit. As described with reference to the example illustrated in FIG. 8B, a time lag occurs until reference destination content can be reproduced after temi_location_ descriptor is received. In this case, a DTS or a PTS may be delayed according to a time lag. Further, since a timeline does not exist in the relative time type format, and therefore temi_timeline_descriptor is not necessary.

Furthermore, in case where splicing_flag indicating 1 has been set, a DTS or a PTS may not be decided by the above method. That is, after a reception time of temi_location_descriptor to which this splicing_flag has been set, reproduction may be started at a point of time at which reference destination content can be reproduced. Thus, flag information indicating whether or not to reproduce reference destination content based on a reception time of temi_location_ descriptor to which splicing_flag indicating 1 has been set may be stored in a descriptor.

Further, by setting a value of a field of nb_addons in a syntax illustrated in FIG. 7C to 2 or more, it is possible to specify a plurality of items of reference destination content. Methods of reproducing a plurality of items of reference destination content specified in this way include (1) a method for simultaneously reproducing a plurality of items of reference destination content and (2) a method for reproducing a plurality of items of reference destination content one by one in storage order. Hence, identification information indicating which one of methods (1) and (2) is used to perform reproduction may be stored in a descriptor. Further, a plurality of items of reference destination content may be grouped, and identification information indicating which one of the methods (1) and (2) is used to perform reproduction may be stored in a descriptor per group.

Fourth Modified Example

Hereinafter, attribute information of a TEMI stream will be described.

The following information related to reproduction control of reference source content and reference destination content may be indicated as attribute information of a TEMI stream.

When reference destination content is obtained via a communication network, delay occurs until reproduction can be started after reception is started depending on bandwidth or congestion of the network. Hence, to synchronize and reproduce reference source content and reference destination content, it is necessary to buffer data of the reference source content until the reference destination content is ready, and delay reproduction of the reference source content.

Alternatively, when it is possible to specify a range of data obtained from the reference destination content, receiving device 200 obtains each access unit in order from an access unit including a subsequent PTS of the reference destination content by taking into account a time required to buffer the reference destination content. For example, receiving device 200 obtains each access unit in order from an access unit of the reference destination content including a PTS which comes, for example, 10 seconds after a PTS of an access unit of the reference source content whose reproduction is started. Thus, receiving device 200 can synchronize and reproduce both items of reference source content and reference destination content after 10 seconds.

Alternatively, (1) when multiview reproduction is performed or (2) reference source content is a basic layer upon scalable coding and reference destination content is an extended layer, strict synchronization and reproduction are requested. However, except for these cases, it is also possible to independently reproduce items of reference source content and reference destination content without synchronizing the items of reference source content and reference destination content. Hence, by indicating a reproduction mode which supports each situation as attribute information of a TEMI stream, receiving device 200 can appropriately reproduce the reference source content and the reference destination content according to this reproduction mode.

Further, attribute information may indicate whether or not temi_timeline_descriptor is included in a TEMI stream. For example, temi_location_descriptor is present and temi_timeline_descriptor is not present in some cases. In such a case, attribute information can indicate that reference destination content is present but it is not necessary to synchronize and reproduce the reference destination content and the reference source content. Alternatively, in the above case, the attribute information may indicate that timelines of the reference destination content and the reference source content are identical. Further, these pieces of information may be indicated by items of independent identification information.

When temi_timeline_descriptor is present, attribute information indicating a timeline type may be indicated. The timeline type includes three types of, for example, an NTP (Network Time Protocol), a time code defined according to IETF of RFC5484, and a time stamp unique to a medium. The NTP, the time code, and the time stamp unique to a medium are indicated by fields of has_ntp, has_timecode, and has_timestamp of temi_location_descriptor, respectively.

Further, a descriptor in which the attribute information is stored may be defined, and this descriptor may be stored in a 2nd loop indicating an attribute per elementary stream in a PMT.

Fifth Modified Example

A storage order of descriptors in a TEMI access unit may be defined in advance. For example, as long as a timeline of reference destination content does not change, a size of temi_timeline_descriptor is fixed. Hence, each descriptor is stored in a TEMI access unit in order of temi_timeline_descriptor, and temi_location_descriptor. Thus, a start position of temi_location_descriptor in the TEMI access unit is fixed. Hence, it is possible to omit processing of analyzing temi_descr_tag and temi_descr_length of temi_timeline_descriptor and deciding a start position of temi_location_descriptor, and reduce processing of receiving device 200.

Further, the start position of a field indicating information of a timeline in temi_location_descriptor is also fixed. Hence, by obtaining data at a position to which a fixed byte offset is added from a head of an access unit, it is possible to obtain information of the timeline without analyzing a descriptor. When it is not assured that temi_timeline_descriptor is always present, receiving device 200 analyzes a value of temi_descr_tag of a head descriptor of an access unit, and determines whether or not temi_location_descriptor is present. Note that, each descriptor which is stored in a TEMI access unit and a flag indicating that a storage order of each descriptor is fixed may be included in a descriptor as attribute information of a TEMI stream.

As location information of reference destination content, a PID of a transport stream for broadcasting may also be specified in addition to a URL used for obtaining content via a communication network. Alternatively, when reference destination content is transmitted via a broadcast channel different from a broadcast channel of reference source content, an identification number of a transport stream may be further specified.

The transmitting method and the receiving method according to one aspect of the present disclosure have been described above with reference to the exemplary embodiment. However, the present disclosure is not limited thereto.

Figure 10A:
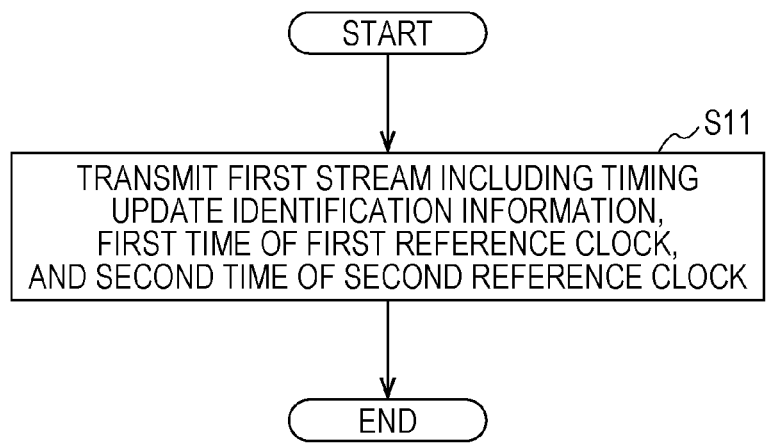
FIG. 10A is a flowchart illustrating a transmitting method according to one aspect of the present disclosure.

FIG. 10A is a flowchart illustrating the transmitting method according to one aspect of the present disclosure.

This transmitting method is a transmitting method for transmitting a first stream related to content of an image or audio, and includes step S11. In this step S11, the first stream including timing update identification information, a first time, and a second time is transmitted. The timing update identification information indicates whether or not a correspondence relationship between a first reference clock and a second reference clock has been updated, the first reference dock being used to transmit and receive the first stream and the second reference clock being used to transmit and receive a second stream related to another content to be reproduced in synchronization with content related to the first stream. The first time is a time of the first reference clock. The second time is a time of the second reference clock, the second time being associated with the first time based on the updated correspondence relationship.

Even this transmitting method can provide the same effect as the effect of the transmitting method according to the above exemplary embodiment.

Figure 10B:
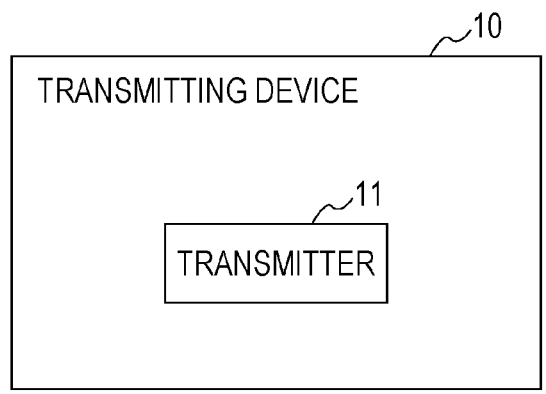
FIG. 10B is a block diagram of the transmitting device according to one aspect of the present disclosure.

FIG. 10B is a block diagram of the transmitting device according to one aspect of the present disclosure.

Transmitting device 10 is a transmitting device which transmits the first stream related to content of an image or audio, and includes transmitter 11. Transmitter 11 transmits the first stream including the timing update identification information, the first time, and the second time. Even transmitting device 10 having such a configuration can provide the same effect as the effect of transmitting device 100 according to the above exemplary embodiment.

Further, the present disclosure may be a data generating method or a data generating device which generates the first stream. That is, the data generating method or the data generating device according to the present disclosure is a method or a device which generates the first stream related to content of an image or audio, and generates the first stream including the timing update identification information, the first time, and the second time. Further, the data generating method according to the present disclosure may include any processing operation, other than transmission, included in the above exemplary embodiment and the modified examples of the exemplary embodiment. The data generating device according to the present disclosure may include any component, other than a component which performs transmission, included in the exemplary embodiment and the modified examples of the exemplary embodiment.

Figure 11A:
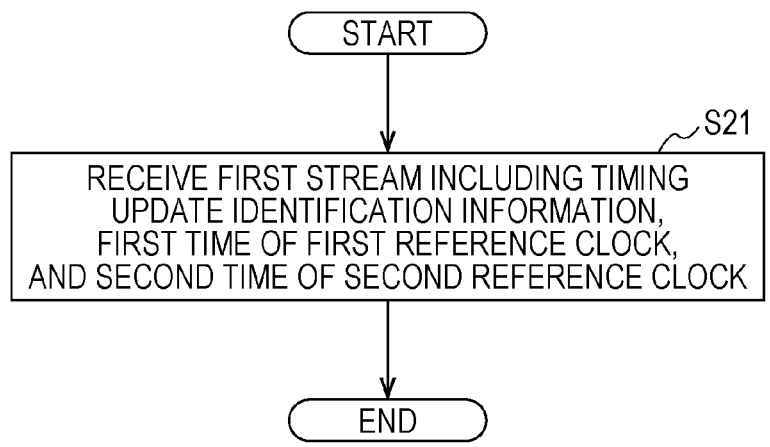
FIG. 11A is a flowchart illustrating a receiving method according to one aspect of the present disclosure.

FIG. 11A is a flowchart illustrating the receiving method according to one aspect of the present disclosure.

This receiving method is a receiving method for receiving the first stream related to content of an image or audio, and includes step S21. In this step S21, the first stream including the timing update identification information, the first time, and the second time is received. The timing update identification information indicates whether or not a correspondence relationship between a first reference clock and a second reference clock has been updated, the first reference dock being used to transmit and receive the first stream and the second reference clock being used to transmit and receive a second stream related to another content to be reproduced in synchronization with content related to the first stream. The first time is a time of the first reference clock. The second time is a time of the second reference dock, the second time being associated with the first time based on the updated correspondence relationship.

Even this receiving method can provide the same effect as the effect of the receiving method according to the above exemplary embodiment.

Figure 11B:
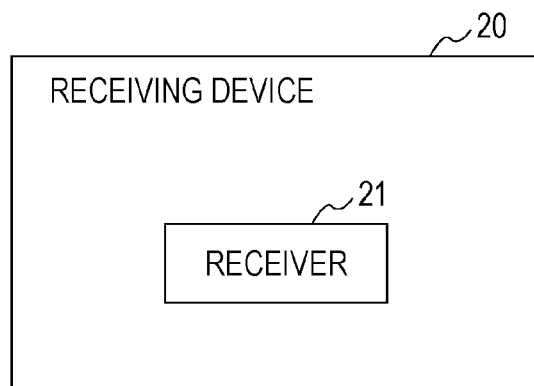
FIG. 11B is a block diagram of a receiving device according to one aspect of the present disclosure.

FIG. 11B is a block diagram of the receiving device according to one aspect of the present disclosure.

Receiving device 20 is a receiving device which receives the first stream related to content of an image or audio, and includes receiver 21. Receiver 21 receives the first stream including the timing update identification information, the first time, and the second time. Even receiving device 20 having such a configuration can provide the same effect as the effect of receiving device 200 according to the above exemplary embodiment.

In the above exemplary embodiment and modified examples of the exemplary embodiment, each component may be configured by dedicated hardware or may be realized by executing a software program suitable to each component. Each component may be realized when a program executing unit such as a CPU or a processor reads and executes a software program recorded in a hard disk or a recording medium such as a semiconductor memory. In this case, software which realizes the transmitting device or the receiving device according to the above exemplary embodiment is the following program. That is, this program causes a computer to execute the steps included in the flowchart illustrated in FIG. 10A or FIG. 11A.

Further, the following cases are included in the present disclosure.

(1) Each of the above devices is more specifically a computer system including a microprocessor, a ROM, a RAM, a hard disk unit, a display unit, a keyboard, and a mouse. In the RAM or the hard disk unit, a computer program is stored. The microprocessor operates according to the computer program, so that each device achieves a function of each device. The computer program described herein is configured by combining a plurality of command codes giving instructions to a computer to achieve a predetermined function.

(2) Part or the entirety of components which constitute each of the above devices may be configured as one system LSI (Large Scale Integration). The system LSI is a super multifunction LSI manufactured by integrating a plurality of components on one chip, and is more specifically a computer system which is configured to include a microprocessor, a ROM, and a RAM. In the RAM, the computer program is stored. The microprocessor operates according to the computer program, so that the system LSI achieves a function of the system LSI.

(3) Part or the entirety of components which constitute each of the above devices may be configured as an IC card or a single module which is detachable from each device. The IC card or the module is a computer system which includes a microprocessor, a ROM, and a RAM. The IC card or the module may include the above super multifunction LSI. The microprocessor operates according to the computer program, so that the IC card or the module achieves a function of the IC card or the module. This IC card or this module may be tamper resistant.

(4) The present disclosure may be the method described above. Further, a computer program may cause the computer to realize these methods or a digital signal may include the computer program.

Furthermore, the present disclosure may cause the computer program or the digital signal to be recorded in computer-readable recording media such as a flexible disk, a hard disk, a CD-ROM, a MO, a DVD, a DVD-ROM, a DVD-RAM, a BD (Blu-ray (registered trademark) Disc), and a semiconductor memory. Still further, the digital signal may be recorded in these recording media.

Moreover, according to the present disclosure, the computer program or the digital signal may be transmitted via an electric communication line, a wireless or wired communication line, a network which is typically the Internet, or data broadcasting.

Further, according to the present disclosure, a computer system may include a microprocessor and a memory, the memory may store the computer program, and the microprocessor may operate according to the computer program.

Further, by recording the program or the digital signal in the recording medium and transmitting the program or the digital signal, or by transporting the program or the digital signal via the network or the like, the program or the digital signal may be executed by another independent computer system.

(5) The exemplary embodiment and the modified examples may be combined.

The transmitting method and the receiving method according to one or a plurality of aspects have been described above based on the exemplary embodiment and the modified examples of the exemplary embodiment. However, the present disclosure is not limited to the exemplary embodiments. As long as it does not deviate from the gist of the present disclosure, exemplary embodiments provided by applying various deformations which a person skilled in the art conceives, to the present exemplary embodiment, and exemplary embodiments constructed by combining components in different exemplary embodiments may be incorporated in a scope of one The transmitting method and the receiving method according to the present disclosure provide an effect that timeline extension can be efficiently performed, and is applicable to, for example, a device or equipment which performs media transport on video data or audio data.

What is claimed is:

1. A transmitting method for transmitting a first stream related to first content including a first image, and a second stream related to second content including a second image, the transmitting method comprising:
    transmitting the first content, content management information about the first content, information related to a resolution of the first content, and time information about the first content;
    transmitting the second stream to cause a receiver to reproduce the second content during a reproduction period of the first content;
    transmitting content management information about the second content, information related to a resolution of the second content, and time information about the second content; and
    transmitting time information for resuming reproduction of the first content, after the second content is reproduced.

2. A receiving method for receiving a first stream related to first content including a first image, and a second stream related to second content including a second image, the receiving method comprising:
    receiving content management information about the first content, information related to a resolution of the first content, and time information about the first content;

receiving the second stream to cause the second content to be reproduced during a reproduction period of the first content;

receiving content management information about the second content, information related to a resolution of the second content, and time information about the second content;

receiving time information for resuming reproduction of the first content, after the second content is reproduced; and reproducing the second content during the reproduction period of the first content.

\* \* \* \* \*